United States Patent [19]

Lystad

[11] Patent Number: 4,570,991
[45] Date of Patent: Feb. 18, 1986

[54] SUN VISOR STOWED ON PILLAR

[75] Inventor: Leonard A. Lystad, Warren, Mich.

[73] Assignee: General Motors Corporation, Detroit, Mich.

[21] Appl. No.: 537,106

[22] Filed: Sep. 29, 1983

[51] Int. Cl.⁴ ................................................. B60J 3/02
[52] U.S. Cl. ................................. 296/97 G; 296/97 H
[58] Field of Search ................ 296/97 R, 97 H, 97 K, 296/97 G, 97 B; 160/DIG. 3

[56] References Cited

U.S. PATENT DOCUMENTS

| | | | |
|---|---|---|---|
| 2,685,336 | 8/1954 | Menighan | 296/97 R |
| 2,863,697 | 12/1958 | Watkins | 296/97 R |
| 3,071,408 | 1/1963 | Turner | 296/97 R |
| 4,005,899 | 2/1977 | Rigney | 296/97 G |
| 4,090,733 | 5/1978 | Altschul | 296/97 B |
| 4,323,275 | 4/1982 | Lutz | 296/97 G |

FOREIGN PATENT DOCUMENTS 600616  12/1959  Italy .................................... 296/974

Primary Examiner—Robert R. Song
Attorney, Agent, or Firm—Charles E. Leahy

[57] ABSTRACT

An elongated sun visor panel of either opaque or tinted material is pivoted on the vehicle body adjacent the juncture between the windshield pillar and the windshield header to enable pivotal movement between a vertical stored position overlying the windshield pillar and a horizontal position partially obstructing either the windshield opening or the side window opening. The elongated panel is preferably divided by a living hinge which provides a longitudinal extending hinge axis by which the panel may be folded to closely overlie the shape of the windshield pillar. A pair of such sun visor panels are preferably provided to enable simultaneous shielding of the occupant relative both the windshield and the side window. The sun visor panel is preferably held in the use position and the stored position by Velcro fasteners, magnets, or a detent associated with the pivot.

4 Claims, 5 Drawing Figures

SUN VISOR STOWED ON PILLAR

The invention relates to a sun visor and more particularly provides a sun visor hinged at the top of the windshield pillar for movement between a conventional position shielding the occupant eyes and a vertical stowed position overlying the windshield pillar.

BACKGROUND OF THE INVENTION

It is well known in motor vehicle bodies to provide a sun visor which may be moved into a use position partially covering the windshield opening to shade the eyes of a vehicle occupant. Such sun visors are traditionally pivoted about a horizontal axis so that the sunshade assumes a stored position adjacent to the vehicle roof. Furthermore, it is known that such a sun visor be pivoted about a vertical axis so that the sun visor may be deployed to partially cover either the windshield opening or the side window opening.

Still other sun visors have been proposed in which tinted plastic panels would be erected from the instrument panel or otherwise mounted on the body to project into partial covering of the windshield opening or the side window opening.

The present invention provides a new and improved sun visor which is pivotally mounted on the pillar for movement between a stored position overlying the windshield pillar and a horizontal use position.

SUMMARY OF THE INVENTION

According to the invention an elongated sun visor panel of either opaque or tinted material is pivoted on the vehicle body adjacent the juncture between the windshield pillar and the windshield header to enable pivotal movement between a vertical stored position overlying the windshield pillar and a horizontal position partially obstructing either the windshield opening or the side window opening. The elongated panel is preferably divided by a living hinge which provides a longitudinal extending hinge axis by which the panel may be folded to closely overlie the shape of the windshield pillar. A pair of such sun visor panels are preferably provided to enable simultaneous shielding of the occupant relative both the windshield and the side window. The sun visor panel is preferably held in the use position and the stored position by Velcro fasteners, magnets, or a detent associated with the pivot.

Accordingly, the object, feature and advantage of the present invention resides in the provision of an elongated sun visor panel pivoted to the vehicle body at the juncture of the windshield header and windshield pillar for movement between a vertical stored position overlying the windshield pillar and a conventional horizontal use position shielding the eyes of the vehicle occupant.

Another object, feature and advantage of the present invention resides in the provision of an elongated sun visor panel hinged to fold about the longitudinal axis thereof for folded storage overlying the windshield pillar and pivoted to the pillar for pivotal movement to a horizontal position shielding the eyes of the vehicle occupant.

A further object, feature and advantage of the invention resides in the provision of an elongated sun visor panel pivotally mounted on the vehicle body adjacent the juncture of the windshield panel and the windshield header and having an associated retainer for holding the sun visor in either a stored position overlying the pillar or a horizontal use position.

DESCRIPTION OF THE DRAWINGS

These and other features, objects and advantages of the invention will become apparent upon consideration of the specification and the appended drawings in which.

DESCRIPTION OF THE PREFERRED EMBODIMENT

Figure 1:
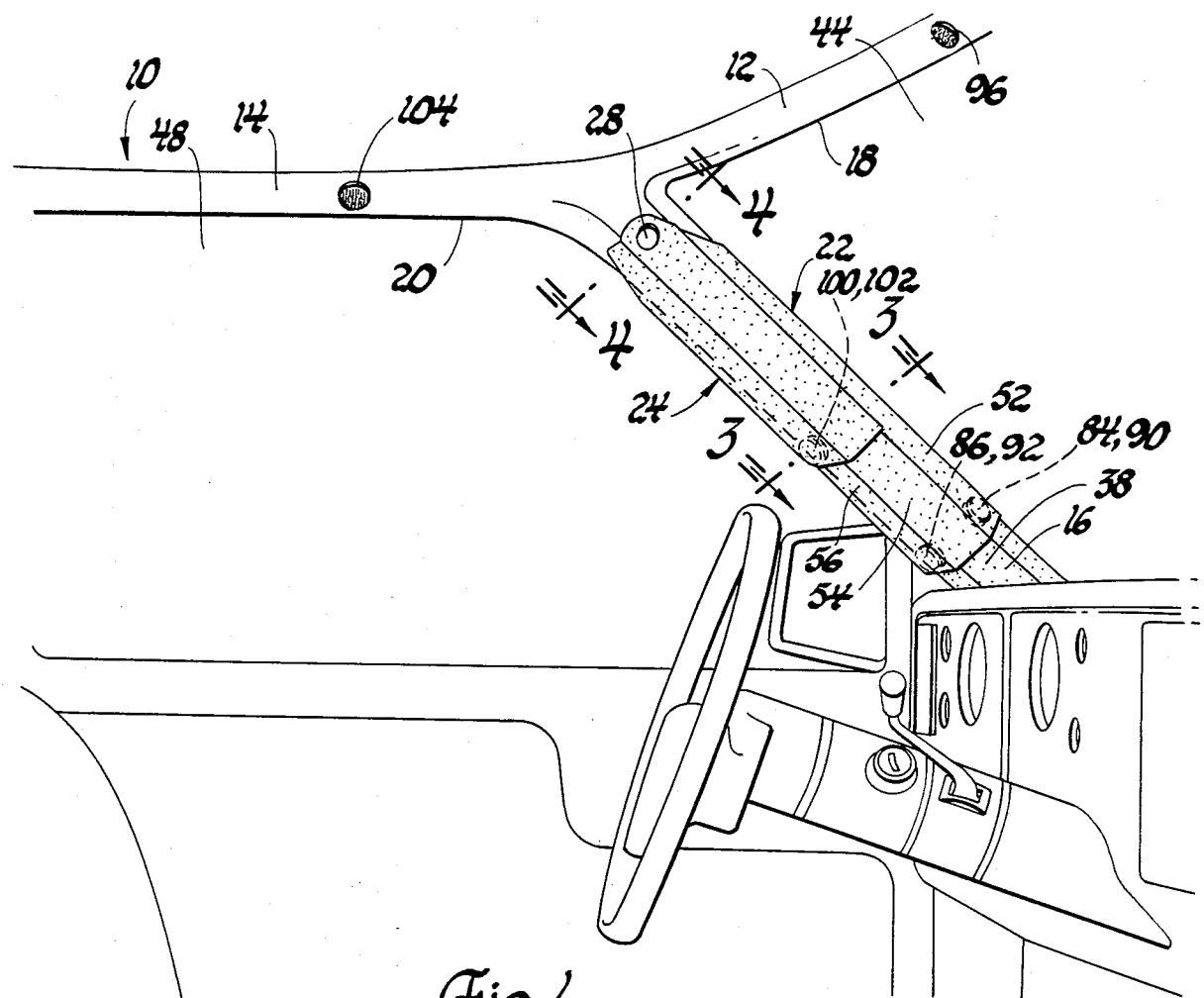
FIG. 1 is a perspective view of a vehicle body interior showing a pair of sun visors according to the invention stored in overlying relationship with the windshield pillar.

Referring to FIG. 1, there is shown a motor vehicle body 10 including windshield header 12 and roof rail 14 which are supported by a windshield pillar 16 to respectively define a windshield opening 18 and a side window opening 20.

Figure 2:
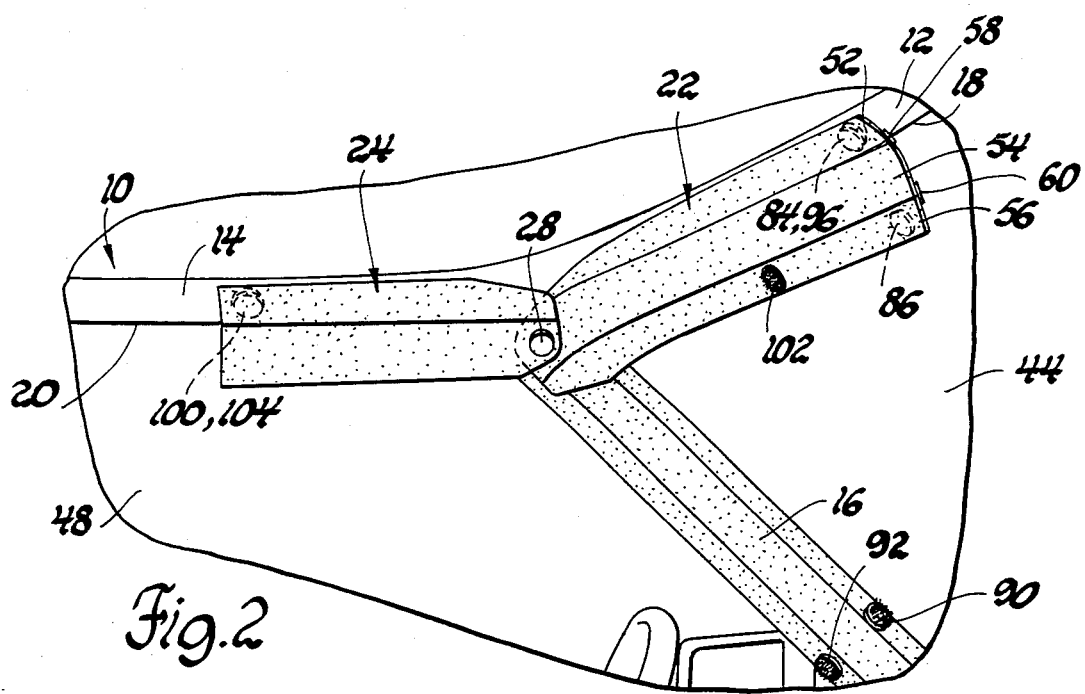
FIG. 2 is a view similar to FIG. 1 but showing the sun visors respectively deployed to their use positions partially covering the windshield opening and the side window opening.

As best seen in FIG. 2, a sun visor 22 is provided for shielding the eyes of the driver by partially covering the windshield opening 18. Likewise a sun visor 24 is provided for shielding the occupant eyes by partially covering the side window opening 20.

As best seen in FIGS. 1 and 2 the ends of the sun visors 22 and 24 are pivotally connected to the pillar 16 adjacent the windshield header and roof rail 14 by a pivot screw 28 to mount the sun visors for movement between horizontal extending use positions shown in FIG. 2 and vertical stored positions overlying the pillar 16 as shown in FIG. 1.

Figure 3:
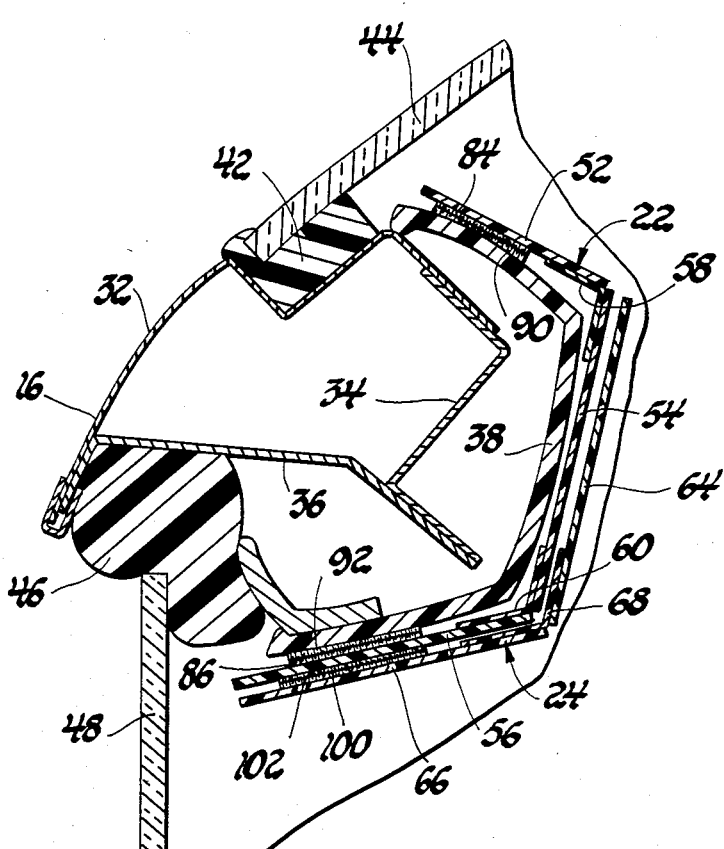
FIG. 3 is a sectional view through the windshield pillar taken in the direction of arrows 3—3 of FIG. 1.
Figure 4:
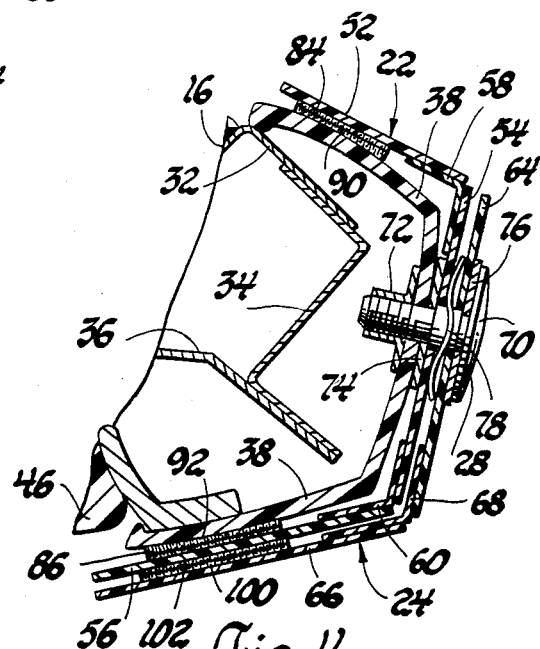
FIG. 4 is a sectional view taken in the direction of arrows 4—4 of FIG. 1 and showing the pivotal connection between the sun visors and the pillar.
Figure 5:
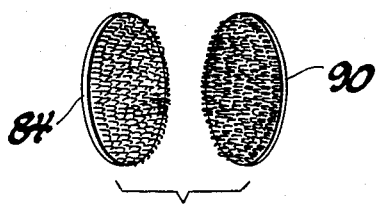
FIG. 5 is a view showing Velcro buttons which may be employed to retain the sun visors in both the stored position and use position.

As seen in FIGS. 3 and 4, the pillar 16 is defined by pillar outer panel 32 and reinforcements 34 and 36 which are welded together to define the pillar. The pillar 16 also includes a plastic trim cover 38 which is substantially C-shaped in cross-section to conceal the sheet metal components of the pillar 16. The pillar 16 carries a bead or adhesive 42 which mounts the windshield 44 and also carries a weatherstrip 46 which seals the side window 48.

Each of the sun visors 22 and 24 is preferably constructed of an opaque or tinted plastic sheet material. The windshield sun visor 22 is a generally rectangular panel and includes three planar panel portions 52, 54 and 56 which are connected together by strips of mylar tape 58 and 60 to define living hinge axes extending longitudinally of the sun visor 22. Thus, the sun visor 22 is arranged to fold as shown in FIGS. 1, 3 and 4 to closely fit the contour of the pillar trim cover 38 and also to unfold to the generally planar configuration of FIG. 2 for partially covering the windshield opening 18.

The side window sun visor 24 includes a pair of sun visor planar panel portions 64 and 66 which are joined together by a strip of mylar tape 68 providing a longitudinal extending living hinge axis by which the side window sun visor 24 is also folded to fit the contour of the pillar trim cover 38 and unfolded to a planar position partially covering the side window.

As best seen in FIG. 4, the sun visors 22 and 24 are pivotally mounted on the pillar trim cover 38 by a pivot screw 28 which extends through aligned apertures in the panel portions 54 and 64 of the sun visors and through the pillar trim cover 38. Screw 28 is retained by a nut 72. A flat washer 74 fits between the trim cover 38 and the sun visor 22 while a similar flat washer 76 fits between the head of screw 70 and the sun visor 24. A wavy washer 78 fits between the sun visors 22 and 24 to introduce a friction detent which assists in holding the sun visors 22 and 24 in either their stored position of FIG. 1 or the use position of FIG. 2.

In addition, buttons of hook and loop fasteners, commonly known as Velcro, are employed to retain the sun visors 22 and 24. For example, the planar portions 52 and 56 of the sun visor 22 carry Velcro hook elements 84 and 86 which mate respectively with Velcro loop elements 90 and 92 mounted on the trim cover 38 to retain the sun visor 22 in the stored position of overlying close fitting relationship with the pillar trim cover 38 as shown in FIGS. 1 and 3. A loop element 96 is attached to the windshield header 12 for mating with the hook element 84 carried on the planar portion 52 of the sun visor 22 to establish the sun visor 22 in the horizontal extending use position of FIG. 2.

Velcro fasteners are also provided for the side window sun visor 24. More particularly, a hook element 100 is adhesively secured to the sun visor panel portion 66 and mates with a loop element 102 adhesively secured to the planar portion segment of the sun visor 22. Thus, as seen in FIGS. 1 and 3 the planar portion 66 of the sun visor 24 is held in close fitting stored relationship relative to the pillar trim cover 38. In addition, a mating loop element 104 is provided on the roof rail 14 to mate with the Velcro hook element 100 on the visor 24 to establish the visor 24 at its horizontal extending use position of FIG. 2.

Thus, it is seen that the invention provides a new and improved sun visor pivotally mounted on the pillar and foldable to a stored relationship overlying the windshield pillar. Although the invention is described herein by reference to the preferred embodiment shown in the drawings, it will be understood that various alternative details of construction may be practiced within the scope of the appended claims. For example, although the sun visors are shown herein as comprised of separate plastic panel portions hingedly joined by a mylar tape, is within the scope of the invention to employ single sheets of plastic material having integral living hinges. Furthermore, the Velcro retainer buttons disclosed herein are intended to be merely illustrative of the suitable retaining means such as snap detents or magnetic retainers or the like which may be employed. Furthermore, although it is desirable to provide a pair of sun visors to simultaneously shield both the windshield and the side window, a single visor may be employed for pivotal movement to alternately shield either the windshield or the side window.

The embodiments of the invention in which an exclusive property or privilege is claimed are defined as follows:

1. A sun visor for shading the eyes of the occupant of a motor vehicle having a windshield header supported by a windshield pillar and comprising:
   a panel adapted for mounting in a horizontal extending position in parallel relationship with the windshield header to shade the vehicle occupant; and
   pivot means mounting the panel on the vehicle body adjacent the juncture of the windshield pillar and the windshield header to support the panel for pivotal movement in an arcuate path about the pivot means between the horizontal position parallel with the windshield header and a stored position in parallel overlying relationship with the windshield pillar.

2. A sun visor for shading the eyes of the occupant of a motor vehicle having a windshield header supported by a windshield pillar and comprising:
   a panel adapted for mounting in a horizontal extending position in parallel relationship with the windshield header to shade the vehicle occupant;
   pivot means mounting the panel on the vehicle body adjacent the juncture of the windshield pillar and the windshield header to support the panel for pivotal movement in an arcuate path about the pivot means between the horizontal position parallel with the windshield header and a stored position in parallel overlying relationship with the windshield pillar; and
   means adapted to selectively retain the panel in the horizontal use position and the vertical stored position.

3. A sun visor for shading the eyes of an occupant in a motor vehicle body having a windshield pillar supporting a windshield header and a roof rail which respectively define a windshield opening and a side window opening, said sun visor comprising:
   an elongated sunshade panel having hinge means defining a longitudinal extending hinge axis by which the panel may be foldably contoured to fit closely about the windshield pillar for storage in overlying relationship therewith; and
   pivot means acting between the panel and the vehicle body at the juncture between the windshield pillar and the windshield header and the roof rail to enable pivotal movement of the panel between the stored position in overlying relationship with the windshield pillar and a generally horizontal use position parallel with either the windshield header or the roof rail to shade the eyes of the vehicle occupant, said hinge means enabling hinging motion of the sunshade panel at the use position to unfold to present a substantial sunshielding presence.

4. Sun visors for shading the eyes of an occupant in a motor vehicle body having a windshield pillar supporting a windshield header and a side roof rail which respectively define windshield opening and a side window opening, said sun visor comprising:
   first and second elongated sun visor panels; and
   pivot means acting between the first and second panels and the vehicle body generally at the juncture between the windshield pillar, the roof rail, and the windshield header to enable pivotal movement of the first panel between a vertical stored position in overlying relationship with the windshield pillar and a generally horizontal shading position parallel with the windshield header to shade the windshield opening and to enable pivotal movement of the second panel between a vertical stored position in overlying relationship with the windshield pillar and a generally horizontal shading position parallel with the roof rail to shade the side window.

* * * * *